United States Patent
Kerchen

(10) Patent No.: US 9,528,556 B2
(45) Date of Patent: Dec. 27, 2016

(54) MULTIPLE NATURAL FREQUENCY COUPLING APPARATUS

(71) Applicant: Comau, Inc., Southfield, MI (US)

(72) Inventor: Robert M. Kerchen, Metamora, MI (US)

(73) Assignee: Comau LLC, Southfield, MI (US)

( * ) Notice: Subject to any disclaimer, the term of this patent is extended or adjusted under 35 U.S.C. 154(b) by 151 days.

(21) Appl. No.: 14/244,307

(22) Filed: Apr. 3, 2014

(65) Prior Publication Data

US 2015/0285313 A1  Oct. 8, 2015

(51) Int. Cl.
| | |
|---|---|
| F16D 25/04 | (2006.01) |
| F16D 3/80 | (2006.01) |
| F16D 3/64 | (2006.01) |
| F16F 15/126 | (2006.01) |
| F16D 3/74 | (2006.01) |
| F16D 47/02 | (2006.01) |

(52) U.S. Cl.
CPC . *F16D 3/80* (2013.01); *F16D 3/64* (2013.01); *F16D 3/74* (2013.01); *F16D 25/046* (2013.01); *F16D 47/02* (2013.01); *F16F 15/126* (2013.01); *F16D 2300/22* (2013.01)

(58) Field of Classification Search
CPC ........ F16F 15/126; F16F 15/20; F16F 7/1017; F16F 7/1028; F16D 25/046; F16D 3/64
See application file for complete search history.

(56) References Cited

U.S. PATENT DOCUMENTS

| | | | |
|---|---|---|---|
| 2,926,546 A | * | 3/1960 | Paulsen ................. F16F 15/126 74/573.12 |
| 3,648,812 A | | 3/1972 | Kost |
| 4,356,724 A | | 11/1982 | Ayoub et al. |
| 4,391,131 A | | 7/1983 | Scourtes |
| 4,592,228 A | | 6/1986 | Lucia |
| 4,593,556 A | | 6/1986 | Wehr |

(Continued)

*Primary Examiner* — Robert Hodge
*Assistant Examiner* — Ryan Dodd
(74) *Attorney, Agent, or Firm* — Young Basile Hanlon & MacFarlane P.C.

(57) ABSTRACT

A multiple natural frequency coupling apparatus for connecting a rotatable driving member to a rotatable driven member of a drive line. The coupling apparatus of the present invention provides a substantially cylindrical housing having a longitudinal axis with a substantially cylindrical outer shaft coaxially aligned with and connected to the housing. A substantially cylindrical inner shaft is coaxially aligned with the outer shaft and the housing. A substantially cylindrical chuck housing is coaxially aligned with the housing, the outer shaft, and the inner shaft wherein the fluid chuck housing is connected to the inner shaft. A substantially cylindrical collapsible sleeve is coaxially aligned with and between the fluid chuck housing and the outer shaft, wherein the collapsible sleeve may move between a non-actuated position, wherein the collapsible sleeve does not engage the outer shaft thereby providing the coupling apparatus with a first torsional stiffness corresponding to a first natural frequency, and an actuated position, wherein the collapsible sleeve engages the outer shaft thereby providing the coupling apparatus with a second torsional stiffness corresponding to a second natural frequency.

19 Claims, 4 Drawing Sheets

(56) References Cited

U.S. PATENT DOCUMENTS

| | | | | |
|---|---|---|---|---|
| 4,763,884 A | * | 8/1988 | Matsui | F16F 13/28 |
| | | | | 267/121 |
| 4,861,005 A | * | 8/1989 | Bausch | F16F 13/28 |
| | | | | 267/140.12 |
| 5,170,997 A | * | 12/1992 | Girard | F16F 13/28 |
| | | | | 180/312 |
| 5,501,434 A | * | 3/1996 | McGuire | B64C 27/51 |
| | | | | 267/140.11 |
| 5,537,865 A | | 7/1996 | Shultz | |
| 8,418,540 B2 | | 4/2013 | Schrotter | |
| 2011/0023629 A1 | | 2/2011 | Bushey et al. | |
| 2013/0079160 A1 | | 3/2013 | Brosowske | |

* cited by examiner

MULTIPLE NATURAL FREQUENCY COUPLING APPARATUS

TECHNICAL FIELD

The present invention relates to a multiple natural frequency coupling apparatus for a drive line, and in particular, a coupling apparatus that extends between a driving member and a driven member wherein the coupling apparatus can provide multiple natural frequencies of the drive line by changing the torsional stiffness of the coupling apparatus and avoiding the vibration and resonance associated with a particular natural frequency of the drive line.

BACKGROUND

Natural frequency is a characteristic of every machine, structure, and object. The natural frequency is the frequency of free vibration of a system, in which the system vibrates to dissipate its energy. The angular natural frequency ($w_n$) of an object, expressed in radian per second, is a function of its stiffness (k) and its mass (m), as exhibited by the following equation:

$$w_n \sqrt{\frac{k}{m}}$$

If either the stiffness (k) or the mass (m) of the object is altered, the natural frequency will change.

When a natural frequency is excited by some external force, an increase in the amplitude of the vibration may result. Such external force may be created by driving the rotation of a drive line. When the natural frequency of the drive line is excited, the operating speed of the system is defined as the "critical speed". If the drive line operates at the critical speed and dampening of the drive line is not present, the vibration created by the natural frequency could damage or destroy the drive line.

The vibration created by such natural frequencies in a drive line can have negative consequences when applied to various test equipment for rotating devices. For instance, in today's automotive industry, engines and transmissions must be cold and hot-tested after they are assembled on the factory floor but before they are assembled into a motor vehicle. Such tests often involve connecting the engine or transmission to a drive line system that rotates or spins the engine or transmission while being coupled to a test machine. In testing the engine or transmission, the drive line system rotates or spins the engine or transmission at various operating speeds or revolutions per minute (rpms) in order to test the engine and transmission under various conditions. However, when driving or rotating the shaft of the test machine, the shaft may reach a natural frequency, thereby causing the drive line system to resonate and vibrate. This will, of course, affect the test results of the engine or transmission, thereby providing possible false indicators as to the test performance of the engine or transmission. In worse case scenarios, the resulting resonance and vibration from a natural frequency occurrence could affect or damage the engine or transmission. Although changing the rotational speed of the drive line could avoid realizing the natural frequency of the drive line, such test equipment typically requires that the tested products rotate at specific rates and times thereby prohibiting the option of changing the drive line speeds.

It would be desirable to provide a coupling apparatus that could effectively change the natural frequency of a drive line so as to avoid the vibration and resonance associated with a particular natural frequency of the drive line.

SUMMARY

The present invention provides a multiple natural frequency coupling apparatus for connecting a rotating driving member to a rotatable driven member of a drive line. The coupling apparatus of the present invention provides a substantially cylindrical housing having a longitudinal axis and a substantially cylindrical outer shaft coaxially aligned with the longitudinal axis and connected to the housing. A substantially cylindrical inner shaft is coaxially aligned with the longitudinal axis and has a torsional stiffness different than the outer shaft. A substantially cylindrical fluid chuck housing is coaxially aligned with the longitudinal axis and connected to the inner shaft. A substantially cylindrical collapsible sleeve is coaxially aligned with the longitudinal axis and disposed between the fluid chuck housing and the outer shaft wherein the collapsible sleeve may move between a non-actuated position, wherein the collapsible sleeve does not engage the outer shaft thereby providing a first torsional stiffness of the coupling apparatus corresponding to a first natural frequency, and an actuated position, wherein the collapsible sleeve engages the outer shaft thereby providing a second torsional stiffness of the coupling apparatus corresponding to a second natural frequency. A substantially cylindrical bearing may be coaxially aligned with said longitudinal axis and located between the housing and the fluid chuck housing wherein the bearing is connected to the housing for rotatably supporting the fluid chuck housing.

The fluid chuck housing includes an annular recess for housing the collapsible sleeve and a passageway in communication with the recess wherein the passageway is communicatable with a pressurized fluid source for communicating pressurized fluid to and from the recess. The collapsible sleeve may move to the actuated position when the recess and the passageway in the fluid chuck housing are pressurized with the pressurized fluid, and the collapsible sleeve may move to the non-actuated position when the recess and the passageway are not pressurized with the pressurized fluid.

A substantially cylindrical mounting disk is coaxially aligned with the longitudinal axis and connected to the housing and the inner shaft wherein the mounting disk is connectable to the driven member. The housing may be connectable to the driving member.

A first dampener is coaxially aligned with the longitudinal axis and connected to the fluid chuck housing for affecting the torsional stiffness and absorbing vibration. The dampener may be connectable to the driving member. The first dampener may provide a substantially cylindrical flange coaxially aligned with the longitudinal axis and connected to the fluid chuck housing. A substantially cylindrical torsionally compliant coupling element may be coaxially aligned with the longitudinal axis and connected to the flange. The flange is connectable to the driving member.

A second dampener may also be coaxially aligned with the longitudinal axis and connected to the inner shaft and the housing for affecting the torsional stiffness and absorbing vibration. The second dampener may include a substantially cylindrical flange coaxially aligned with the longitudinal axis and connected to the fluid chuck housing. A substantially cylindrical torsionally compliant coupling element may be coaxially aligned with the longitudinal axis and connected to the flange. A substantially cylindrical mounting disk may be coaxially aligned with the longitudinal axis and connected to the flange wherein the mounting disk is connectable to the driven member.

The outer shaft may have a greater torsional stiffness than the inner shaft.

BRIEF DESCRIPTION OF THE DRAWINGS

The various features, advantages and other uses of the present apparatus will become more apparent by referring to the following detailed description and drawings in which.

DETAILED DESCRIPTION

Figure 1:
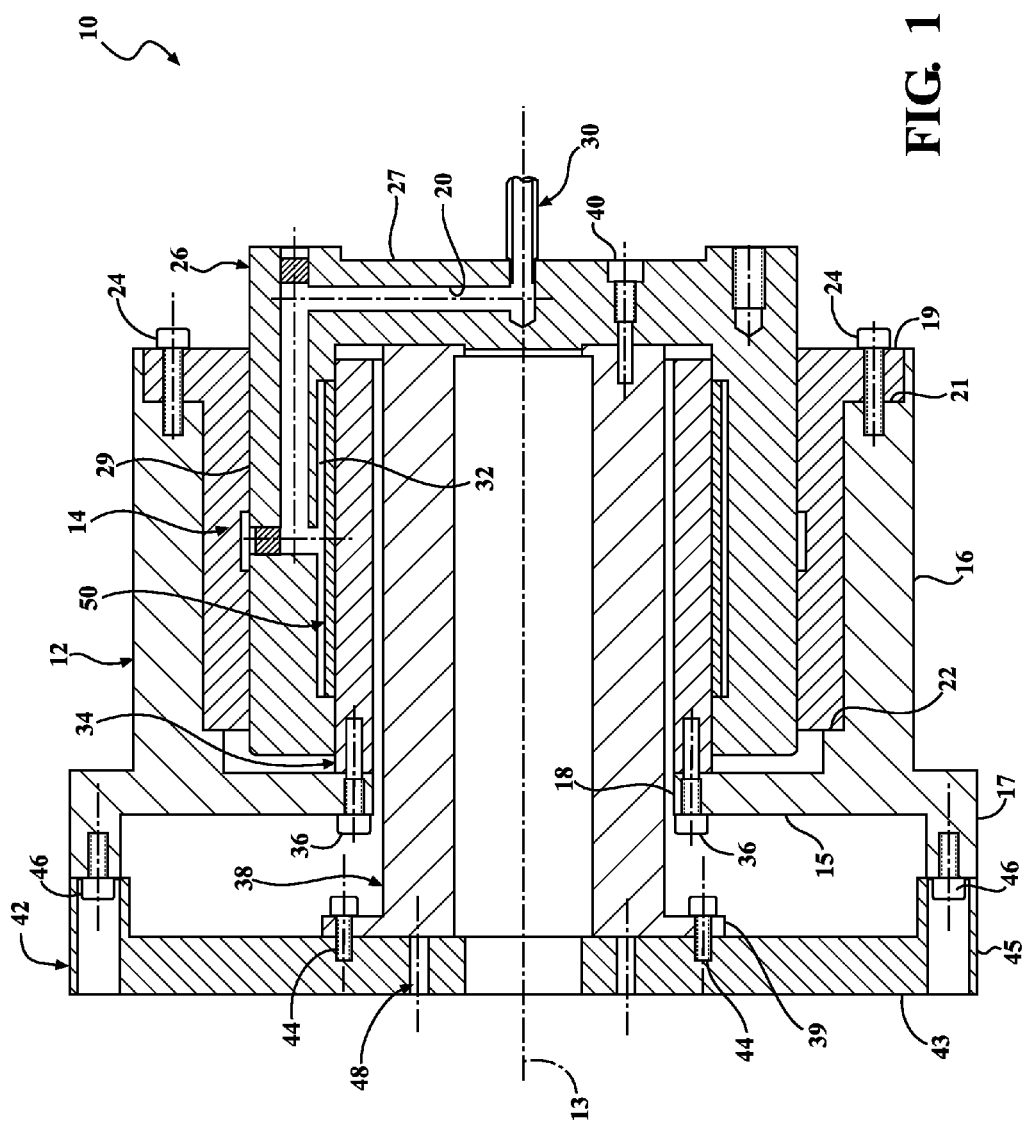
FIG. 1 is a sectional view showing the multiple natural frequency coupling apparatus of the present invention.

Referring to the drawings, the present invention will now be described in detail with reference to the disclosed embodiment.

Figure 2:
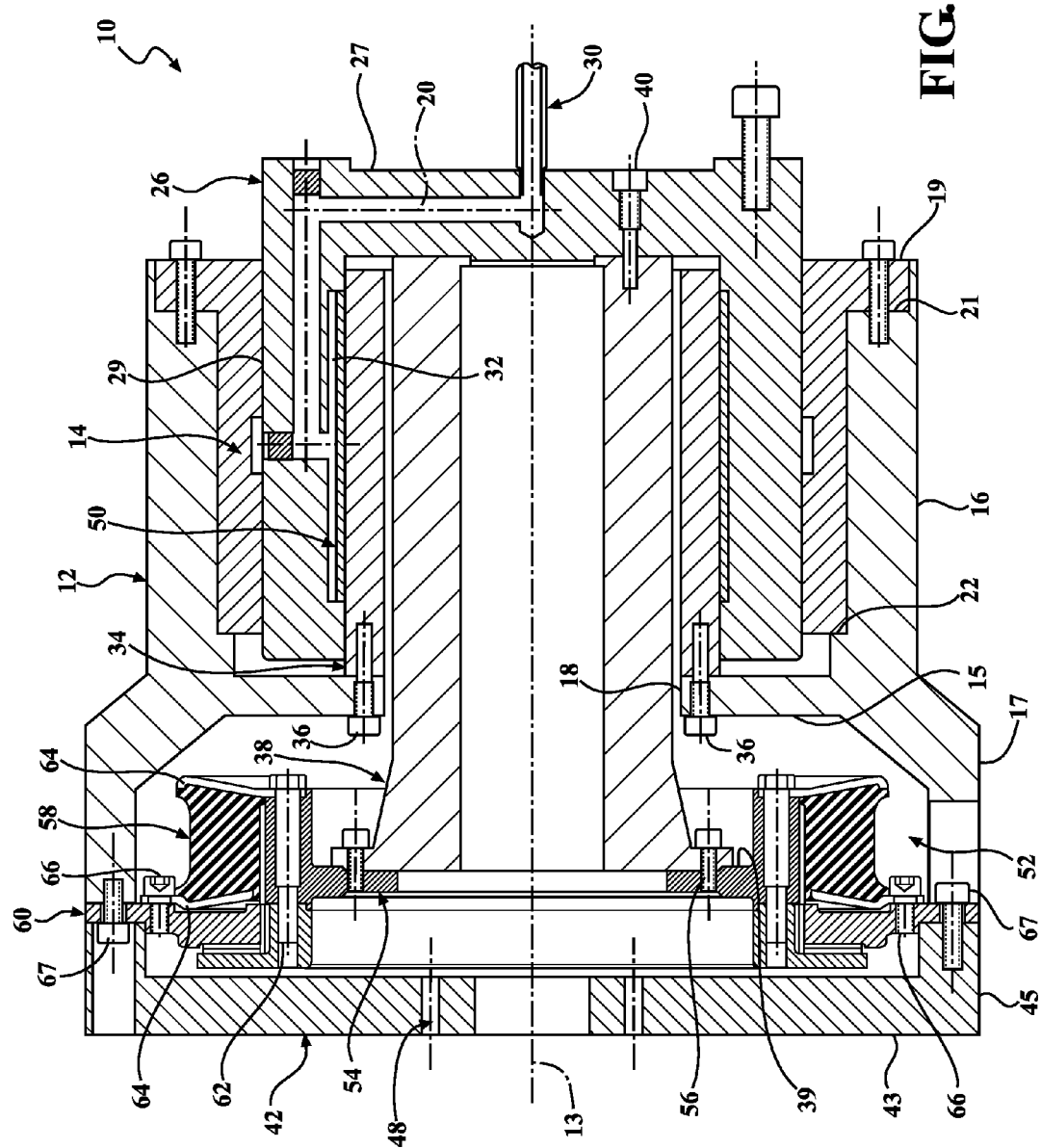
FIG. 2 is a sectional view of the multiple natural frequency coupling apparatus of the present invention having a dampening mode and a non-dampening mode.
Figure 3:
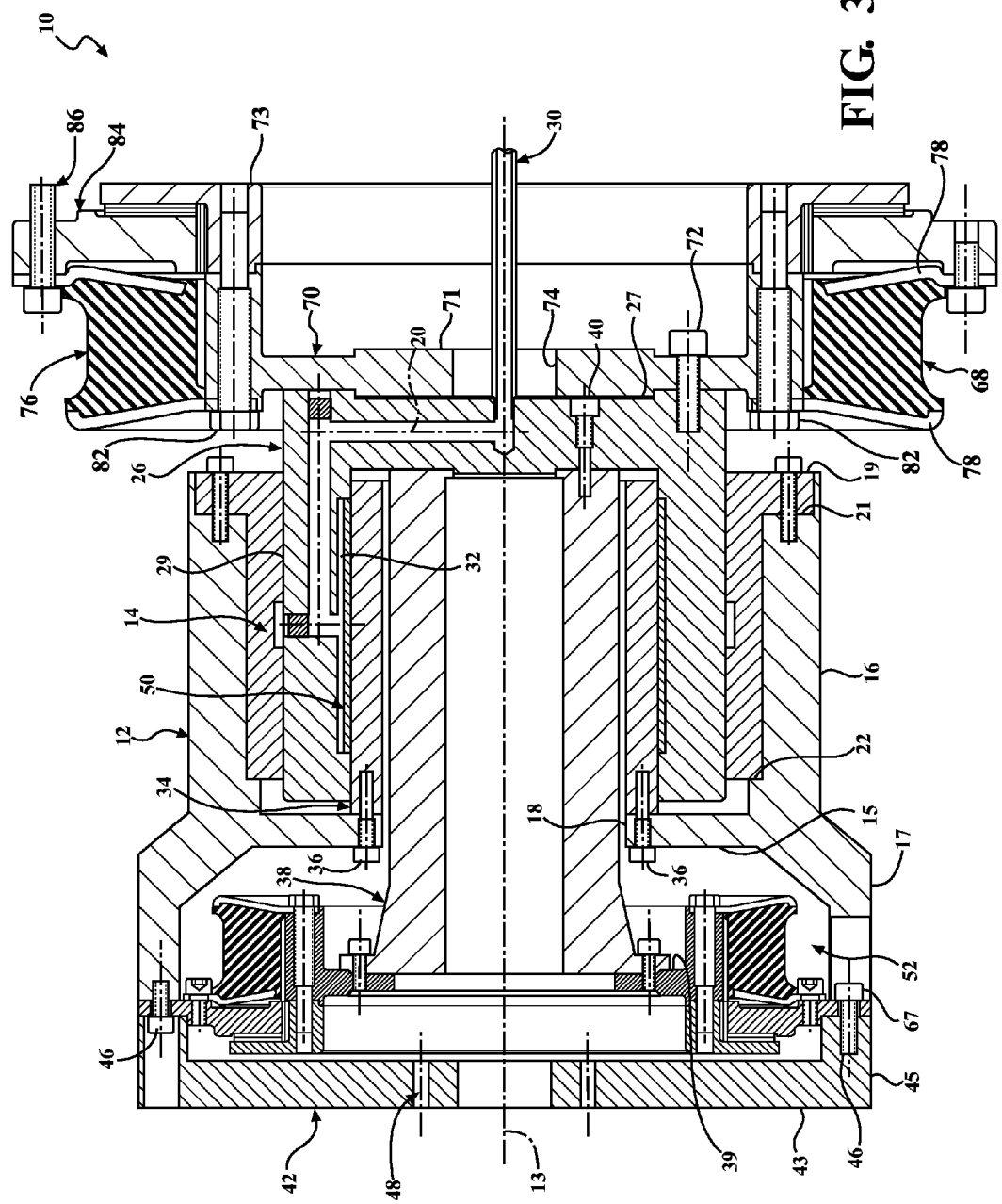
FIG. 3 is a sectional view of the multiple natural frequency coupling apparatus of the present invention having dual dampening modes.

The present invention provides a multiple natural frequency coupling apparatus 10 for connecting a rotating driving member (not shown) to a rotatable driven member (not shown) of a drive line (not shown). The coupling apparatus 10 of the present invention may be used in various drive line applications wherein the rotating system is sensitive to resonance and vibration from natural frequencies of the drive line. Although the following is not an inclusive list, such drive lines may include automotive engine test machines, automotive transmission test machines, marine propulsion drive lines, compressor drive lines, pumping action drive lines, etc. The coupling apparatus 10 of the present invention is placed between and connected to the driving member and the driven member of the drive line or rotatable system. In order to prohibit the drive line from rotating at a natural frequency, thereby causing vibration and resonance in the drive line, the coupling apparatus 10 has the ability to change the natural frequency of the drive line. As previously noted, the natural frequency is a function of the stiffness and mass of the system, and since the mass of the coupling apparatus remains relatively constant, the natural frequency of the coupling apparatus 10 will change upon changing its torsional stiffness. This is accomplished by having the coupling apparatus 10 provide a structure which allows for the torque to be transmitted through two different structures having different torque stiffnesses. As seen in FIGS. 1-3, the coupling apparatus 10 provides a collapsible sleeve 50 which may move between a non-actuated position, wherein torque is transmitted through an inner shaft 38 of the coupling apparatus 10 having a first torsional stiffness, and an actuated position, wherein torque is transmitted through an outer shaft 34 of the coupling apparatus 10 having a second torsional stiffness. The difference in the torsional stiffnesses allows the coupling apparatus 10 to operate at two different natural frequencies. The natural frequency that is not excited by the drive line is the natural frequency that is utilized, as this will be the application that does not create vibration and resonance from a natural frequency. The coupling apparatus 10 may also include dampeners 52, 68 which may help to absorb any vibration in the drive line while also affecting the natural frequencies by changing the torque stiffness of the coupling apparatus 10.

As seen in FIG. 1, the coupling apparatus 10 provides a substantially cylindrical housing 12 having a generally U-shaped cross-section having a substantially circular bottom wall 15 and annular side walls 16, 17 that are integral with and extending from each side of the bottom wall 15. The annular side wall 16 has a smaller diameter and longer length than the annular side wall 17. The housing 12 is essentially concentric about a longitudinal axis 13 wherein the housing 12 has an aperture 18 that extends through the bottom wall 15 and is coaxial with the longitudinal axis 13. The housing 12 may be fabricated from a high strength material, such as steel, aluminum, or metal alloy.

To rotatably support the inner mechanisms of the coupling apparatus 10, a sleeve bearing 14 is seated along an inner diameter or surface of the annular side wall 16 of the housing 12. The sleeve bearing 14 is substantially cylindrical with an annular rim 19 extending radially outward from one end of the sleeve bearing 14. The rim 19 of the sleeve bearing 14 is seated within a mating recess 21 formed in the end of the annular side wall 16 of the housing 12, and the opposite end of the sleeve bearing 14 is seated within a mating recess 22 provided in the inner diameter of the annular side wall 16 of the housing 12. The sleeve bearing 14 is connected to the housing 12 through the use of conventional fasteners 24 extending through threaded apertures provided in the rim 19 of the sleeve bearing 14 and the end of the annular side wall 16 of the housing 12. The sleeve bearing 14 is coaxially aligned with the longitudinal axis 13 and the housing 12.

In order to transmit torque from the driving member to the driven member, the coupling apparatus 10 provides a substantially cylindrical fluid chuck housing 26 positioned adjacent the sleeve bearing 14 in a coaxial relationship with the longitudinal axis 13, the sleeve bearing 14, and the housing 12. The fluid chuck housing 26 has a substantially U-shaped cross-section with a substantially circular bottom wall 27 and an integral annular side wall 29 extending away from the bottom wall 27. The outer diameter of the annular side wall 29 is positioned adjacent the inner diameter of the sleeve bearing 14, and the bottom wall 27 of the fluid chuck housing 26 closes one end of the housing 12. The fluid chuck housing 26 has a passageway 20 which opens into and through the bottom wall 27 and the annular side wall 29 of the fluid chuck housing 26. The passageway 20 opens into and is in communication with a recess 32 formed in the inner diameter of the annular side wall 29 of the fluid chuck housing 26. The entrance of the passageway 20 leading out from the bottom wall 27 of the fluid chuck housing 26 may have a pipe 30 connected thereto which leads to and is in communication with a pressurized fluid source (not shown). The fluid chuck housing 26 may be fabricated from a high strength material, such as steel, aluminum, or metal alloy.

To provide the coupling apparatus with different natural frequencies, the outer shaft 34 is substantially cylindrical and has its outer diameter extend within and adjacent the inner diameter of the fluid chuck housing 26. The outer shaft is coaxially aligned with the longitudinal axis 13, the fluid chuck housing 26, the sleeve bearing 14, and the housing 12. By being adjacent the inside diameter of the fluid chuck housing 26, the outer diameter of the outer shaft 34 defines a portion of the recess 32 formed in the fluid chuck housing 26. The outer shaft 34 is connected to the bottom wall 15 of the housing 12 through conventional fasteners 36 extending through the bottom wall 15 of the housing 12 and into the end of the outer shaft 34. The outer shaft 34 may be fabricated from a high strength material, such as steel, aluminum, or metal alloy, wherein the outer shaft 34 has predetermined first torsional stiffness.

Within the outer shaft 34 is the inner shaft 38 which is substantially cylindrical and extends coaxially along the longitudinal axis 13, the outer shaft 34, the fluid chuck housing 26, the sleeve bearing 14, and the housing 12. The outer diameter of the inner shaft 38 is radially spaced from the inner diameter of the outer shaft 34 and extends from the bottom wall 27 of the fluid chuck housing 26 through the aperture 18 in the housing 12. The inner shaft 38 is connected to the bottom wall 27 of the fluid chuck housing 26 through the use of a conventional fastener 40 which extends through the bottom wall 27 of the fluid chuck housing 26 and into the end of the inner shaft 38. The inner shaft 38 has an integral rim 39 that extends radially outward from one end of the inner shaft 38. The inner shaft 38 is connected to a mounting disk 42 through the use of conventional fasteners 44 extending through the rim 39 of the inner shaft 38 and into the mounting disk 42. The inner shaft 38 may be fabricated from a high strength material, such as steel, aluminum or metal alloy, wherein the inner shaft 38 has a second torsional stiffness different from that of the outer shaft 34.

To connect the coupling apparatus 10 to the driven member, the mounting disk 42 has a substantially cylindrical configuration coaxially aligned with the longitudinal axis 13. The mounting disk 42 has a substantially circular bottom wall 43 with an integral annular side wall 45 extending away from the bottom wall 43. The mounting disk 42 is not only connected to the inner shaft 38, as previously described, but the mounting disk 42 is also connected to the annular side wall 17 of the housing 12 through the use of conventional fasteners 46 extending through the annular side wall 45 of the mounting disk 42 and the annular side wall 17 of the housing 12. The mounting disk 42 provides threaded apertures 48 extending through the bottom wall 43 for receiving threaded fasteners (not shown) for connecting the driven member thereto. The mounting disk 42 may be fabricated from a high strength material, such as steel, aluminum, or metal alloy.

In order to change the natural frequency associated with the coupling apparatus 10, the collapsible sleeve 50 is disposed within the recess 32 provided between the fluid chuck housing 26 and the outer shaft 34. The collapsible sleeve 50 has a substantially annular configuration and is coaxially aligned with the longitudinal axis 13, the fluid chuck housing 26, and the outer shaft 34. The collapsible sleeve 50 has the ability to move between a non-actuated position, wherein pressurized fluid is not provided within the recess 32 and the passageway 28 of the fluid chuck housing 26, thereby allowing the collapsible sleeve 50 to relax and not engage the outer shaft 34, and an actuated position, wherein the recess 32 and the passageway 28 of the fluid chuck housing 26 are pressurized with pressurized fluid, thereby forcing the collapsible sleeve 50 to engage the outer shaft 34. When the collapsible sleeve 50 is in the actuated position, the fluid chuck housing 26, in conjunction with the collapsible sleeve 50, drives the rotation of the outer shaft 34 when the fluid chuck housing 26 is driven by the driving member. When the collapsible sleeve 50 is in the non-actuated position, the fluid chuck housing 26 does not drive the outer shaft 34 directly, but rather, the fluid chuck housing 26 transmits torque through the inner shaft 38 due to its direct connection with the fluid chuck housing 26, wherein the fluid chuck housing 26 is directly driven by the driving member.

As previously noted, the natural frequency of the coupling apparatus 10 is affected by the torsional stiffness of the outer shaft 34 and the inner shaft 38. The outer shaft 34 has a torsional stiffness that is higher than the torsional stiffness of the inner shaft 38, although the inner shaft 38 may have a higher torsional stiffness than the outer shaft 34, so long as the torsional stiffness of the inner shaft 38 and the outer shaft 34 are different. Since the natural frequency of the coupling apparatus 10 is based on its torsional stiffness and mass, the torsional stiffness of the coupling apparatus 10 will affect the natural frequency of the drive line. The mass of the coupling apparatus 10 remains relatively the same, as the mass of the pressurized fluid entering and exiting the fluid chuck housing 26 is negligible relative to the mass of the coupling apparatus 10. When the collapsible sleeve 50 is not actuated, torque is transmitted from the driving member to the fluid chuck housing 26 and through the inner shaft 38. This creates a first natural frequency of the coupling apparatus 10 corresponding to a first torsional stiffness of the coupling apparatus 10 based on the torsional stiffness of the inner shaft 38. When the collapsible sleeve 50 is actuated, torque is transmitted directly from the driving member to the fluid chuck housing 26 and through the outer shaft 34 which has a different torsional stiffness than the inner shaft 38. This creates a second natural frequency of the coupling apparatus 10 based on a second torsional stiffness of the outer shaft 34 of the coupling apparatus 10. By actuating and deactuating the collapsible sleeve 50 with the pressurized fluid, the coupling apparatus 10 may provide a choice of two natural frequencies of the drive line, thereby ensuring that the drive line will not experience at least one of the natural frequencies and the vibration and resonance associated with such natural frequencies.

Figure 4:
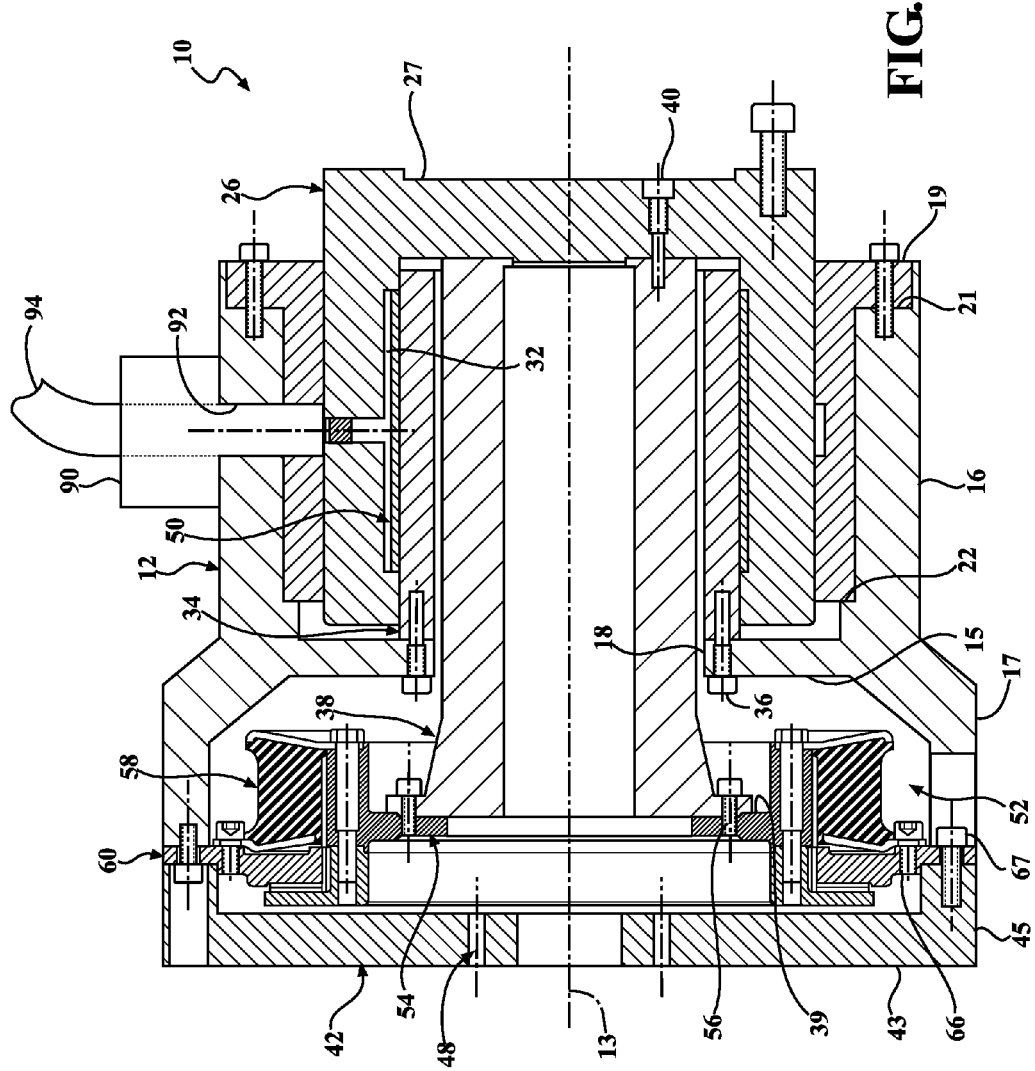
FIG. 4 is a sectional view of the multiple natural frequency coupling apparatus of the present invention having a rotary union for supplying pressurized fluid.

In an alternative embodiment, the pressurized fluid may be supplied to the recess 32 of the coupling apparatus 10 through the use of a different structure. As seen in FIG. 4, a rotary union 90 may be connected to the outer diameter of the housing 12. The rotary union 90 provides a passageway 92 that extends through the housing 12, the sleeve bearing 14, and the fluid chuck housing 26 and is in communication with the recess 32. A hose 94 is connected to the rotary union 90 thereby communicating the pressurized fluid from the pressurized fluid source to the passageway 92 which in turn is in communication with the recess 32. The rotary union 90 eliminates the need for a central feed as exhibited by pipe 30 in the other embodiments.

In another embodiment of the present invention, the dampener 52 may be utilized in conjunction with the coupling apparatus 10 to absorb vibration in the drive line while also providing a means to affect the torsional stiffness, and thus the natural frequency, of the coupling apparatus 10. The dampener 52 is conventional and may provide different configurations and mounting structures. As seen in FIG. 2, the dampener 52 has a substantially cylindrical inner flange 54 that is connected to one end of the inner shaft 38 through the use of conventional fasteners 56 which extend through the rim 39 of the inner shaft 38 and into the inner flange 54. The inner flange 54 of the dampener 52 is coaxially aligned with the longitudinal axis 13 and may be fabricated from a high strength material such as steel, aluminum, or metal alloy. A substantially annular torsionally compliant coupling element 58 fabricated from a flexible dampening material is connected to the outer perimeter of the inner flange 54 and is coaxially aligned with the longitudinal axis 13. A substantially annular outer flange 60 is connected to the inner flange 54 through the use of conventional fasteners 62. The outer flange 60 is also coaxially aligned with the longitudinal axis 13 and fabricated from a high strength material, such as steel, aluminum, or metal alloy. The torsionally compliant coupling element 58 has supportive sides 64 extending along both sides of the coupling element 58, wherein the supportive sides 64 of the coupling element 58 are connected to the outer flange 60 through the use of conventional fasteners 66. The outer perimeter of the outer flange 60 is connected to the housing 12 and the mounting disk 42 through the use of conventional fasteners 67. The mounting disk 42 provides the threaded apertures 48 extending through the bottom wall 43 for connecting the mounting disk 42 to the driven member with conventional fasteners, as previously described.

In this embodiment, the dampener 52 is connected to the inner shaft 38, and therefore, the torsional stiffness of the coupling apparatus 10 is affected when the collapsible sleeve 50 is in the non-actuated position, since the fluid chuck housing 26 directly drives the inner shaft 38 when the collapsible sleeve 50 is not actuated. When the collapsible sleeve 50 is actuated, the fluid chuck housing 26 drives the outer shaft 34 directly, as described in the previous embodiment. Again, the coupling apparatus 10 is provided with two possible natural frequencies wherein one of the natural frequencies will be affected by the torsional stiffness of the dampener 52.

In yet another embodiment of the present invention, the second dampener 68 is placed at the opposite end of the coupling apparatus 10 as compared to the first dampener 52. The second dampener 68 is also conventional and may provide different configurations and mounting structures. As seen in FIG. 3, the second dampener 68 provides a substantially cylindrical inner flange 70 having a substantially circular bottom wall 71 and an annular side wall 73 extending from the bottom wall 71. The inner flange 70 is connected to the fluid chuck housing 26 through the use of conventional fasteners 72 extending through the bottom wall 71 of the inner flange 70 and into the bottom wall of the fluid chuck housing 26. An aperture 74 may be provided in the bottom wall 71 of the inner flange 70 for allowing the pipe 30 to extend from the fluid chuck housing 26 and through the inner flange 70 to the pressurized fluid source. The inner flange 70 is coaxially aligned with the longitudinal axis 13 and fabricated from a high strength material, such as steel, aluminum, or metal alloy. A torsionally compliant coupling element 76 having a substantially cylindrical configuration is connected to the outer periphery of the inner flange 70. The torsionally compliant coupling element 76 is fabricated from a flexible dampening material having a pair of supportive sides 78 for securing and supporting the torsionally compliant coupling element 76. One of the supportive sides 78 of the torsionally compliant coupling element 76 is connected to the inner flange 70 through the use of conventional fasteners 82. The opposite supportive side 78 of the torsionally compliant coupling element 76 is connected to an outer flange 84 of the second dampener 68 through conventional fasteners 86. The outer flange 84 is substantially cylindrical and coaxially aligned with the longitudinal axis 13 and is fabricated from a high strength material, such as steel, aluminum, or metal alloy. The outer flange 84 is connected to the inner flange 70 through the use of the conventional fasteners 82. The outer flange 84 may be connected to the driving member.

By adding the dampeners 52, 68 at both ends of the coupling apparatus 10, the dampeners 52, 68 can be applied in both the non-actuated and actuated positions of the coupling apparatus 10. The coupling apparatus 10 will realize a dampening effect regardless of whether the torque is being transmitted through the inner shaft 38 or the outer shaft 34. The dampeners 52, 68 will also absorb a certain amount of vibration in the drive line while also affecting the torsional stiffness of the coupling apparatus 10 when the collapsible sleeve 50 is in either the non-actuated or actuated positions.

The present invention also anticipates the use of a plurality of coupling apparatuses connected in series so that a multiple of torsional stiffnesses could be established in a single drive line. This would provide numerous natural frequencies that could be established for the drive line thereby providing a lesser chance of the drive line rotating at a natural frequency.

In operation, the coupling apparatus 10 has one end connected to the driving member and the opposite end connected to the driven member. The pipe 30 of the coupling apparatus 10 is connected to the pressurized fluid source. Depending on the rotational speed of the drive line, the coupling apparatus 10 may start in the non-actuated position, wherein the collapsible sleeve 50 does not engage the outer shaft 34 thereby allowing torque to be transmitted directly through the inner shaft 38. If the drive line reaches a natural frequency causing vibration and resonance in the drive line, then the coupling apparatus 10 may be moved to the actuated position whereby pressurized fluid is provided through the passageway 28 and into the recess 32. The pressurized fluid moves the collapsible sleeve 50 into the actuated position wherein the collapsible sleeve 50 engages the outer shaft 34 thereby allowing torque to be transmitted through the outer shaft 34 of the coupling apparatus 10. Since the outer shaft 34 has a different torsional stiffness than the inner shaft 38, a different natural frequency will be established. Presuming the drive line is being driven at the same rotational speed, the different natural frequency will not be reached, and therefore, the drive line will not experience vibration or resonance of the first natural frequency.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A multiple natural frequency coupling apparatus for rotatably connecting a rotatable driving member to a rotatable driven member of a drive line, comprising:
   a substantially cylindrical housing having a longitudinal axis;
   a substantially cylindrical rigid outer shaft coaxially aligned with said longitudinal axis and connected to said housing;
   a substantially cylindrical inner shaft coaxially aligned with said longitudinal axis and having a torsional stiffness about said longitudinal axis different than said outer shaft;
   a substantially cylindrical fluid chuck housing coaxially aligned with said longitudinal axis and connected to said inner shaft; and
   a substantially cylindrical collapsible sleeve coaxially aligned with said longitudinal axis and disposed between said fluid chuck housing and said outer shaft, wherein said collapsible sleeve may move between a non-actuated position, wherein said collapsible sleeve does not engage said outer shaft thereby providing a first torsional stiffness of said coupling apparatus corresponding to a first natural frequency when said inner shaft is rotatably driven, and an actuated position, wherein said collapsible sleeve engages said outer shaft thereby providing a second torsional stiffness of said coupling apparatus corresponding to a second natural frequency when said outer shaft is rotatably driven.

2. The coupling apparatus as stated in claim 1, further comprising:
a substantially cylindrical bearing coaxially aligned with said longitudinal axis and located between said housing and said fluid chuck housing for rotatably supporting said fluid chuck housing, wherein said bearing is connected to said housing.

3. The coupling apparatus as stated in claim 1, further comprising:
a substantially cylindrical mounting disk coaxially aligned with said longitudinal axis and connected to said housing and said inner shaft, wherein said mounting disk is connectable to said driven member.

4. The coupling apparatus as stated in claim 1, further comprising:
said fluid chuck housing connectable to said driving member.

5. The coupling apparatus as stated in claim 1, further comprising:
a dampener coaxially aligned with said longitudinal axis and connected to said fluid chuck housing.

6. The coupling apparatus as stated in claim 5, further comprising:
said dampener connectable to said driving member.

7. The coupling apparatus as stated in claim 5, wherein said dampener further comprises:
a substantially cylindrical flange coaxially aligned with said longitudinal axis and connected to said fluid chuck housing;
a substantially cylindrical torsionally compliant coupling element coaxially aligned with said longitudinal axis and connected to said flange; and
said flange connectable to said driving member.

8. The coupling apparatus as stated in claim 1, further comprising:
a dampener coaxially aligned with said longitudinal axis and connected to said inner shaft and said housing.

9. The coupling apparatus as stated in claim 8, further comprising:
a substantially cylindrical mounting disk coaxially aligned with said longitudinal axis and connected to said dampener, wherein said mounting disk is connectable to said driven member.

10. The coupling apparatus as stated in claim 8, wherein said dampener further comprises:
a substantially cylindrical flange coaxially aligned with said longitudinal axis and connected to said inner shaft and said housing;
a substantially cylindrical torsionally compliant coupling element coaxially aligned with said longitudinal axis and connected to said flange; and
a substantially cylindrical mounting disk coaxially aligned with said longitudinal axis and connected to said flange and said housing, wherein said mounting disk is connectable to said driven member.

11. The coupling apparatus as stated in claim 1, further comprising:
said outer shaft having a torsional stiffness greater than said inner shaft.

12. A multiple natural frequency coupling apparatus for rotatably connecting a rotatable driving member to a rotatable driven member of a drive line, comprising:
a substantially cylindrical housing having a longitudinal axis;
a substantially cylindrical rigid outer shaft coaxially aligned with said longitudinal axis and connected to said housing;
a substantially cylindrical inner shaft coaxially aligned with said longitudinal axis and having a torsional stiffness about said longitudinal axis different than said outer shaft;
a substantially cylindrical fluid chuck housing coaxially aligned with said longitudinal axis and connected to said inner shaft;
a substantially cylindrical collapsible sleeve coaxially aligned with said longitudinal axis and disposed between said fluid chuck housing and said outer shaft, wherein said collapsible sleeve may move between a non-actuated position, wherein said collapsible sleeve does not engage said outer shaft thereby providing a first torsional stiffness of said coupling apparatus corresponding to a first natural frequency when said inner shaft is rotatably driven, and an actuated position, wherein said collapsible sleeve engages said outer shaft thereby providing a second torsional stiffness of said coupling apparatus corresponding to a second natural frequency when said outer shaft is rotatably driven; and
said fluid chuck housing having an annular recess for housing said collapsible sleeve and having a passageway in communication with said recess and communicable with a pressurized fluid source for communicating pressurized fluid to and from said recess.

13. The coupling apparatus as stated in claim 12, further comprising:
said collapsible sleeve moveable to said actuated position when said recess and said passageway in said fluid chuck housing are pressurized with said pressurized fluid, and said collapsible sleeve moveable to said non-actuated position when said recess and said passageway are not pressurized with said pressurized fluid.

14. A multiple natural frequency coupling apparatus for connecting a rotatable driving member to a rotatable driven member of a drive line, comprising:
a substantially cylindrical housing having a longitudinal axis;
a substantially cylindrical outer shaft coaxially aligned with and connected to said housing and having a first torsional stiffness;
a substantially cylindrical inner shaft coaxially aligned with said housing and said outer shaft, and said inner shaft having a second torsional stiffness;
a substantially cylindrical fluid chuck housing coaxially aligned with and connected to said inner shaft, and said fluid chuck housing having a passageway in communication with a pressurized fluid source for communicating pressurized fluid to a recess formed between said fluid chuck housing and said outer shaft; and
a substantially cylindrical collapsible sleeve coaxially aligned with said outer shaft and said fluid chuck housing and disposed within said recess, wherein said collapsible sleeve may move between a non-actuated position, wherein said recess is not pressurized with pressurized fluid thereby not engaging said collapsible sleeve with said outer shaft and providing a first torsional stiffness of said coupling apparatus corresponding to a first natural frequency, and an actuated position, wherein said recess is pressurized with pressurized fluid thereby engaging said collapsible sleeve with said outer shaft and providing a second torsional stiffness of said coupling apparatus corresponding to a second natural frequency.

15. The coupling apparatus as stated in claim 14, further comprising:
a substantially cylindrical sleeve bearing connected to said housing and coaxially aligned with and located between said housing and said fluid chuck housing for rotatably supporting said fluid chuck housing.

16. The coupling apparatus as stated in claim 14, further comprising:
a substantially cylindrical mounting disk coaxially aligned with and connected to said housing, wherein said mounting disk is connectable to said driven member.

17. The coupling apparatus as stated in claim 14, further comprising:
a substantially cylindrical dampener coaxially aligned with and connected to said housing and said inner shaft; and
a substantially cylindrical mounting disk coaxially aligned with and connected to said dampener, wherein said mounting disk is connectable to said driven member.

18. The coupling apparatus as stated in claim 14, further comprising:
a substantially cylindrical dampener coaxially aligned with and connected to said fluid chuck housing, wherein said dampener is connectable to said driving member.

19. The coupling apparatus as stated in claim 14, further comprising:
said fluid chuck housing connectable to said driving member.

\* \* \* \* \*